Feb. 24, 1931.   O. W. DUNLAP   1,793,785
GLARE DIFFUSER
Filed Sept. 25, 1930
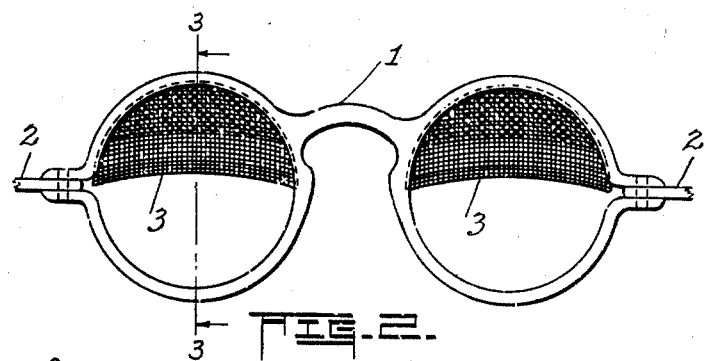
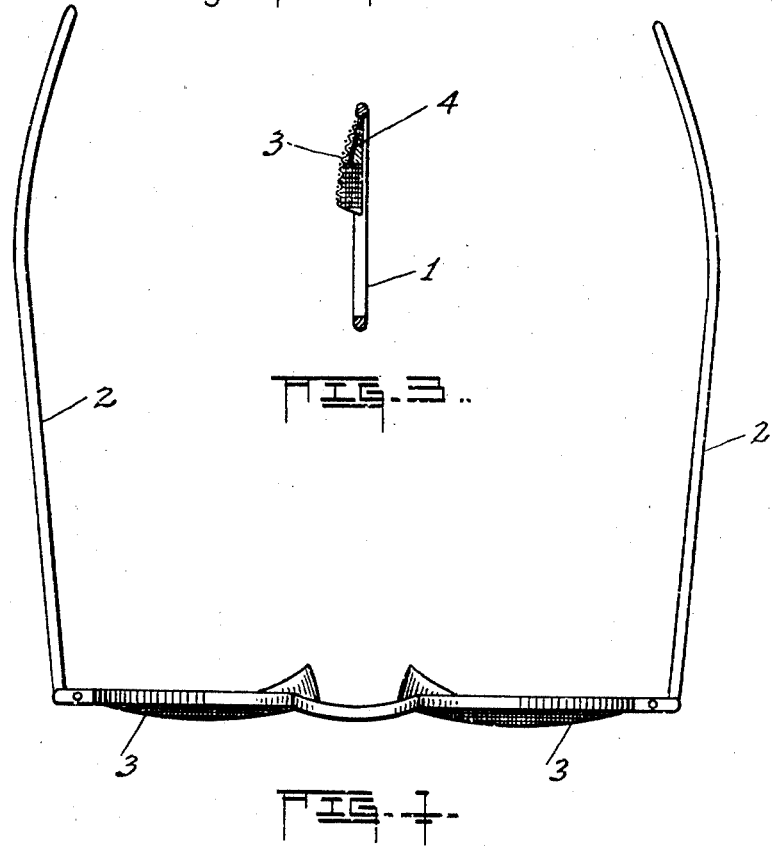
INVENTOR
OLIVER W. DUNLAP
BY
ATTORNEY Patented Feb. 24, 1931

1,793,785

UNITED STATES PATENT OFFICE

OLIVER W. DUNLAP, OF BLOOMINGTON, ILLINOIS

GLARE DIFFUSER

Application filed September 25, 1930. Serial No. 484,282.

This invention relates to improvements in glare diffusers and more particularly to the provision of means for diffusing the glare of the sun during the day or approaching lights from trains or automobiles at night when driving.

It is an object of the this invention to provide a device which may be secured over the rims of eye glasses or made up in the frames of glasses such as the user ordinarily wears, or made up in plain frames for the use of people who ordinarily do not wear eye glasses, and which without distorting or discoloring the rays of light will so diffuse them that the wearer can drive in their direction without discomfort.

It is recognized that devices for this purpose have been heretofore constructed employing colored glass or celluloid for reducing the glare of the sun or approaching head lights and in so doing absorb the rays other than the color of the glass or celluloid and thereby reducing the wearer's vision, particularly at night. It is another object of this invention to break up the rays of light without absorption so as to diffuse the light which passes through this device and thereby reduce the glare.

With these and other objects in view reference is made to the accompanying sheet of drawings which illustrates a preferred form of this invention with the understanding that minor detail changes may be made without departing from the scope thereof.

Figure 1, is a top plan view of an ordinary spectacle frame to which this invention has been applied.

Figure 2, is a view in front elevation of Figure 1.

Figure 3, is a view taken in vertical transverse section on the line 3—3 of Figure 2.

The reference numeral 1 denotes the frame of an ordinary pair of spectacles in which the lenses have been omitted. Numeral 2 indicates the ordinary bows. As shown, the upper half of each eye piece, normally holding the lens, is covered entirely from a point slightly above the center to the rims with a fine wire mesh 3 which is secured within the rims in any desired manner. The upper half of this wire mesh section is covered by a piece of colored transparent material 4, such as colored glass or colored celluloid. It is to be noted that the wire mesh portion 3 extends from side to side and is preferably curved outwardly as shown in Figure 3.

From the construction illustrated it is readily understood that the wearer may look directly through the center of the eye pieces of the frame 1 without having his vision impaired, however, any rays of light approaching the wearer above his direct line of vision will strike the wire mesh and in passing therethrough will be diffused and the glare from the source of such light will not impinge upon his eye, as when the wearer is driving an automobile during the day. The colored portion 4 above the upper half of the wire mesh will further reduce the glare or strength of the light impinging thereon without impairing the wearer's vision.

In driving an automobile at night when the lights of approaching automobiles or trains are at a distance the unobstructed lower portion of the wire mesh diffuses the light therefrom so as to prevent the glare from impinging upon the wearer's eye without impairing his vision as to objects near at hand and when the approaching lights become so near as to cause inconvenience or as when driving in the day time when the sun is low and is in the direct line of vision the wearer by slightly bending his head forward will bring the wire mesh into his line of vision and thereby diffuse the approaching lights, while at the same time he is free to look to either side or below the mesh without having his vision impaired.

In driving during the day time in the direction of the sun, while the sun is considerably above the line of vision of the wearer the strength of the rays of light impinging upon the wire mesh are diffused and that portion which passes through the mesh and strikes the upper colored portion is partially absorbed whereby a softening effect is produced and the wearer may drive in the direction of the sun without discomfort.

It is to be understood that the essence of this invention is the provision of the combined wire mesh and colored upper section which may be either applied to spectacle frames without glass as shown, or to spectacle frame containing lenses, or to frames which may be removably secured over the customary spectacle frame without departing from the spirit of this invention.

What I claim is:

1. A glare diffuser comprising a spectacle frame, a section of fine wire mesh extending from just above the normal line of vision from side to side and thereabove secured to the frame, and a section of colored light absorbing material secured to the frame at one side of the wire mesh and covering the upper half of said mesh.

2. In a glare diffuser, the combination of a spectacle frame having eye pieces with a section of fine wire mesh covering the upper half of each eye piece above the normal line of sight secured thereto, and a section of colored transparent material mounted upon each eye piece at one side of the fine wire mesh and extending over the upper half thereof, whereby rays of light passing through the upper portion of the wire mesh are diffused and partially absorbed and those passing through the lower part are diffused.

OLIVER W. DUNLAP.